(12) United States Patent
Costa (10) Patent No.: US 7,565,955 B2
(45) Date of Patent: *Jul. 28, 2009

(54) INTEGRATED MOTORCYCLE BRAKE AND SUSPENSION SYSTEM

(76) Inventor: Vincenzo F. Costa, 15572 Computer La., Huntington Beach, CA (US) 92849

( * ) Notice: Subject to any disclaimer, the term of this patent is extended or adjusted under 35 U.S.C. 154(b) by 0 days.

This patent is subject to a terminal disclaimer.

(21) Appl. No.: 11/899,929

(22) Filed: Sep. 8, 2007

(65) Prior Publication Data

US 2007/0296266 A1    Dec. 27, 2007

Related U.S. Application Data

(63) Continuation-in-part of application No. 11/340,087, filed on Jan. 26, 2006, and a continuation-in-part of application No. 11/062,196, filed on Feb. 18, 2005.

(51) Int. Cl.
*F16D 57/00* (2006.01)
(52) U.S. Cl. .................... 188/272; 188/322.12; 267/66; 267/68
(58) Field of Classification Search ................ 188/272, 188/322.12; 267/66, 68; 280/275, 276, 277, 280/283, 284
See application file for complete search history.

(56) References Cited

U.S. PATENT DOCUMENTS

| | | | | | |
|---|---|---|---|---|---|
| 2,455,334 | A | * | 11/1948 | Hill et al. ..................... | 137/580 |
| 4,327,928 | A | * | 5/1982 | Chalmers .................... | 280/277 |
| 4,367,882 | A | * | 1/1983 | Alexander et al. .......... | 280/276 |
| 6,520,524 | B1 | * | 2/2003 | Costa .......................... | 280/276 |
| 6,848,721 | B2 | * | 2/2005 | Brans .......................... | 285/302 |

FOREIGN PATENT DOCUMENTS

WO    WO 9013470 A1 * 11/1990

* cited by examiner

*Primary Examiner*—Xuan Lan Nguyen
(74) *Attorney, Agent, or Firm*—Clement Cheng (57) ABSTRACT

A motorcycle brake and suspension system comprising: an outer tube, having an upper end and a lower end, a mainspring mounted inside the outer tube, a brake line traveling through the central axis of the outer tube and looped to allow slack, and a braking system actuated by the brake line. The brake line actuates an integrated padlock caliper disk brake, and is protected by a flexible plastic cover. A fender bracket is mounted on the brake caliper. The integrated padlock caliper disk brake system has integrally formed brake fluid passages in the fork leg, which are hydraulically operative inside the load bearing portion of the fork leg. An adjustable push rod supports the mainspring by adjusting its neutral position length.

16 Claims, 6 Drawing Sheets

INTEGRATED MOTORCYCLE BRAKE AND SUSPENSION SYSTEM

This application is a continuation in part of inventor Vincent Costa Ser. No. 11/062,196 integrated Brake and Suspension System filed Feb. 18, 2005. This application is a continuation in part of applicant's integrated motorcycle brake and suspension system Ser. No. 11/340,087 filed Jan. 26, 2006. This application incorporates by reference both disclosure made in both parent applications.

DISCUSSION OF RELATED ART

Motorcycle front fork components such as brake calipers are traditionally mounted to the exterior of the motorcycle fork frame, allowing for easier maintenance and replacement of vital components. This assembly method also disfavorably allows for the infiltration of dust and other various foreign objects that detrimentally interact with the motorcycle machinery. Though shielding may be added to exterior brake lines and components to prevent any such interaction, it also adds additional complexity and cost. Furthermore, the appearance of lines and components detracts from the ability of the custom motorcycle designer to work with the design. A designer should have the option of routing the lines such that they are either appearing or not apparent.

Previously, a variety of supporting and suspension mechanisms have been devised to provide hydraulic actuation of brake line fluid. A number of these included solutions for maintaining constant volume in the brake line fluid. U.S. Pat. No. 6,848,721 issued to Brans on Feb. 1, 2005 provides a telescopic connector for vehicle a brake conduit. Unfortunately, telescopic connectors have leaking problems between seals required to maintain the constant volume. The constant motion and telescopic translation did not provide robust hydraulic action. Furthermore, the costs of complex telescopic brake line connection such as that shown in the Brans reference provides ample opportunities for mechanical failure, which could be dangerous given the importance of front brakes in a motorcycle. Therefore, it is a present object of the invention to provide robust hydraulic action that is more reliable and does not leak. Brans devised such a complex system to provide internal lines since it is an important feature.

Thus, one way to avoid the constant volume problem is to have an external line or by using a cable instead of a hydraulic configuration. A variety of configurations have been invented providing hydraulic braking on motorcycles using different configurations. The cable configuration is more commonly seen on bicycles using a brake cable. Hydraulic braking in bicycle applications is more rare, but some instances can be seen such as Patent Cooperation Treaty application WO 90/13470 providing for a hydraulic rim brake on a bicycle. The hydraulic rim brake for the bicycle provides opposing pistons pressing against opposite sides of a bicycle rim where each piston is located on an opposite leg of a bicycle. The bicycle configuration rim brake has limited use in a motorcycle front fork due to the forces involved in motorcycle front fork assembly. Traditionally, opposing piston rim brake causes deflection between the legs of the motorcycle fork which bind and otherwise interfere with operation of the motorcycle suspension. Thus, motorcycle fork assemblies have traditionally mounted a rotor to the front wheel axle to provide an interface for a brake externally and modularly attached to a front fork leg. Such a mounting allows caliper to be unbolted as a complete assembly. Therefore, both halves of the caliper are manufactured from pieces of metal separate from the fork leg. Additional brackets or hardware is required to mount the brake to the fork leg.

Other problems with suspension mechanisms have been associated with the deformation of the motorcycle suspension fork. Brake mechanisms typically exert a substantial amount of force against a rotor such as a disk rotor. The calipers typically exert substantial force throughout an entire braking cycle. Therefore, it is also a present object of the invention to avoid deformation that would bind a telescopic suspension system of a motorcycle. The traditional rim brake bicycle configuration typically cannot be used on a motorcycle having telescopic tight tolerance suspension.

DETAILED DESCRIPTION OF THE PREFERRED EMBODIMENT

The present invention is an integrated motorcycle brake and suspension system. As shown in the figures, an assembly of a push rod and outer tube shows the manner of creating a front fork assembly having telescopic connection. A pair of two suspension members forms the motorcycle fork. These suspension members are similar in operation and physical components, except the brake caliper leg has an internal brake line and integrated brake.

Figure 1:
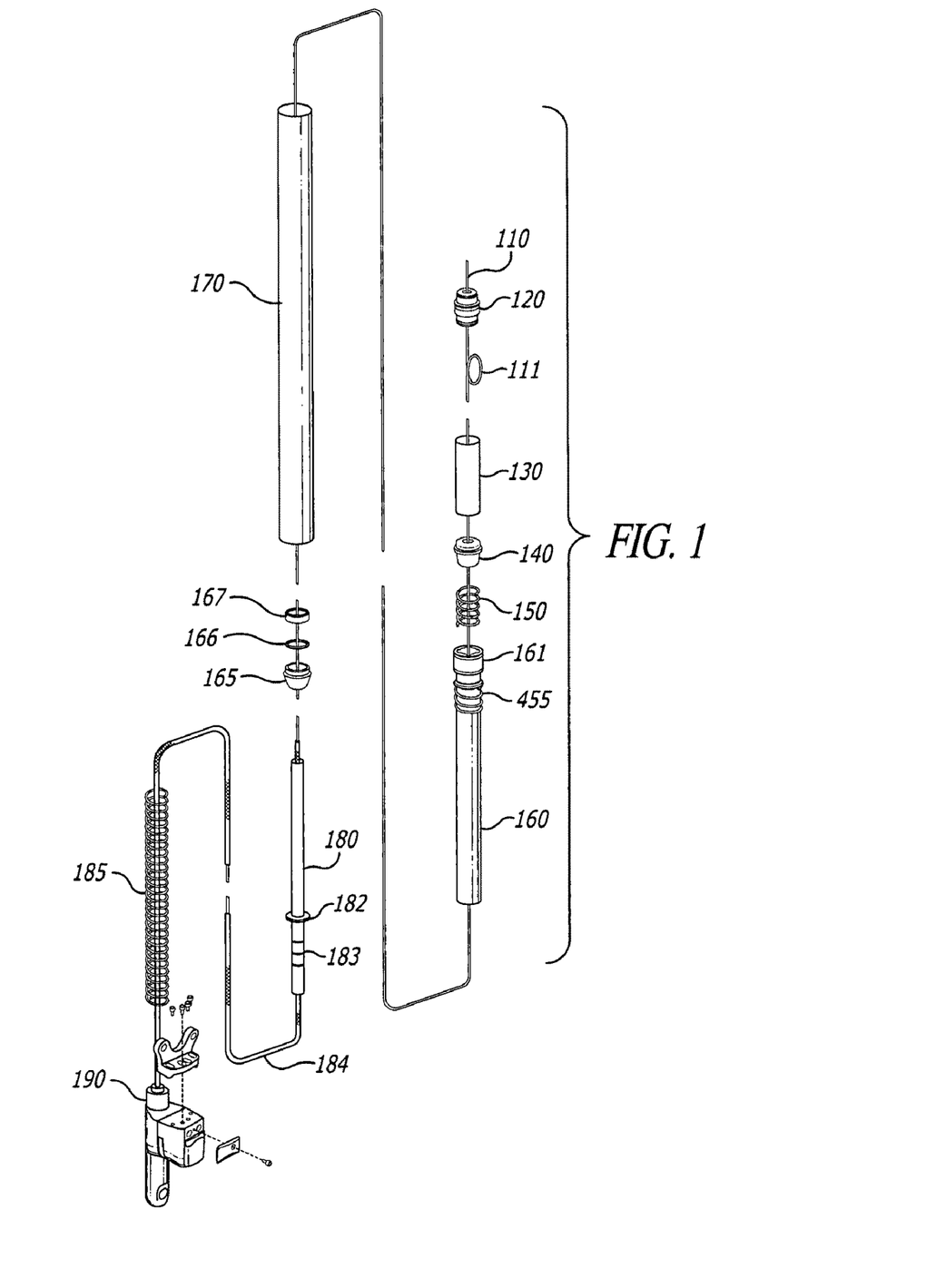
FIG. 1 is an exploded view of the caliper leg of the invention.

The brake line 110, FIG. 1 is connected to and runs from a manually operated brake actuator through a central axis of the outer tube and mainly coaxially related components. Brake line 110 first passes through an upper retainer 120 also called a body cap in the first embodiment. The upper retainer 120 has an upper portion sized tube retain within a fork tree or clamp. The upper retainer 120 is also called a body cap because it is preferably cylindrical at a middle portion which has the largest external diameter of the body cap portions. The upper retainer 120 has a lower portion below the middle portion that has ring seals typically made of elastomeric material for retaining oil within the system. The upper retainer 120 is threaded at an external periphery on the upper portion and lower portion allowing screw connection to the inside upper circumferential surface of the upper cylinder 130 which incidentally preferably has a common external diameter with the upper retainer 120. The middle portion alternatively fits entirely within the upper cylinder 130 if the diameter of the middle portion is sized so that it can fit within the upper cylinder 130.

The brake line 110 then passes through a variety of load bearing hollow tubes starting with an upper cylinder 130 whereby the brake line 110 forms a line loop 111. The line loop preferably forms a complete loop immediately below the upper retainer 120 and entirely within the upper cylinder 130. The upper retainer 120 is formed as a cap having a central aperture receiving the brake line 110 within the central aperture so that the brake line 110 may pass through the upper retainer 120 in hydraulic sealed connection so that the brake line 110 does not move relative to the upper retainer 120 and further is hydraulically sealed in the interface between the brake line 110 and the central aperture of upper retainer 120.

The line loop 111 is not attached to other elements, and allows slack when the telescoping components move and change the length of the motorcycle suspension system. The line loop 111 is made of a single line without a break such that it is continuous. The motorcycle suspension system moves during normal riding, and typically moves more during a ride over uneven surface. The line loop 111 is encapsulated within upper cylinder 130. The looping of the line may move the line from a coaxial orientation relative to the upper cylinder 130 to an orientation that is not coaxial. The line loop preferably expands so that it rests against the inside wall of the upper cylinder 130 at the apex of the line loop 111. The line loop 111 may also have a base opposite the apex. The apex of the line loop 111 and the base of the line loop 111 may take up an area between the inside walls of the upper cylinder 130 having substantial similarity in wideness as the wideness of the inside walls of the upper cylinder 130.

The upper cylinder attaches to an upper plug that is also called a spring top 140. The spring top 140 has a construction somewhat similar to the upper retainer 120. It has an upper portion spring top that connects to the inside surface of upper cylinder 130. The spring top 140 also has an aperture for the brake line 110 so that the spring top brake line aperture may provide a hydraulic sealed connection but does not provide a retaining connection with the brake line 110. As the spring top 140 has retaining connection with the brake line 110 but the upper retainer 120 does not have retaining connection with the brake line 110, the line loop 111 expands when the front motorcycle fork leg contracts. The line loop 111 contracts upon expansion of the motorcycle fork leg. The top portion of the spring top 140 is preferably in threaded connection against the inside surface of upper cylinder 130 which is similarly threaded to receive the top portion of the spring top 140.

The bottom portion of the spring top 140 is preferably in a conical configuration adapted to a bottom out spring 150. The bottom portion of the spring top 140 supports the bottom out spring 150 which rests against a middle portion of the spring top 140. The middle portion of the spring top 140 is a wider portion preferably having a similar outside diameter as the upper cylinder 130, so that the middle portion of the spring top 140 can connect to the upper cylinder 130 and provide support for the bottom out spring 150. The upper cylinder 130 is also called a bottom out spacer that retains the line loop 111. The bottom out spacer 130 attaches to the body cap 120 above, and the spring top 140 below. The bottom out spacer dimensions affect the performance of the suspension system. The spring top bottom portion receives and presses against the bottom out spring 150. The conical portion of the spring top bottom portion maintains the bottom out spring 150 in coaxial orientation with the other fork leg components. The spring top bottom portion preferably has a slight taper and a rounded or blunt tip as shown in FIG. 1. The spring top 140 is also called an upper plug because it plugs the bottom of bottom out spacer 130.

The bottom out spring 150 rests against piston 161. The piston 161 has a top surface that biases against bottom out spring 151 if the fork leg is in bottom out position. The piston 161 has an external surface which is sized to translate within the main housing 170. The piston 161 has preferably a pair of seals to provide hydraulic seal against the inside of the main housing 170. The piston 161 is mounted on top of the inside tube assembly 160.

The inner tube assembly 160 also fits in telescoping configuration inside the main housing formed as a cylinder 170.

Figure 4:
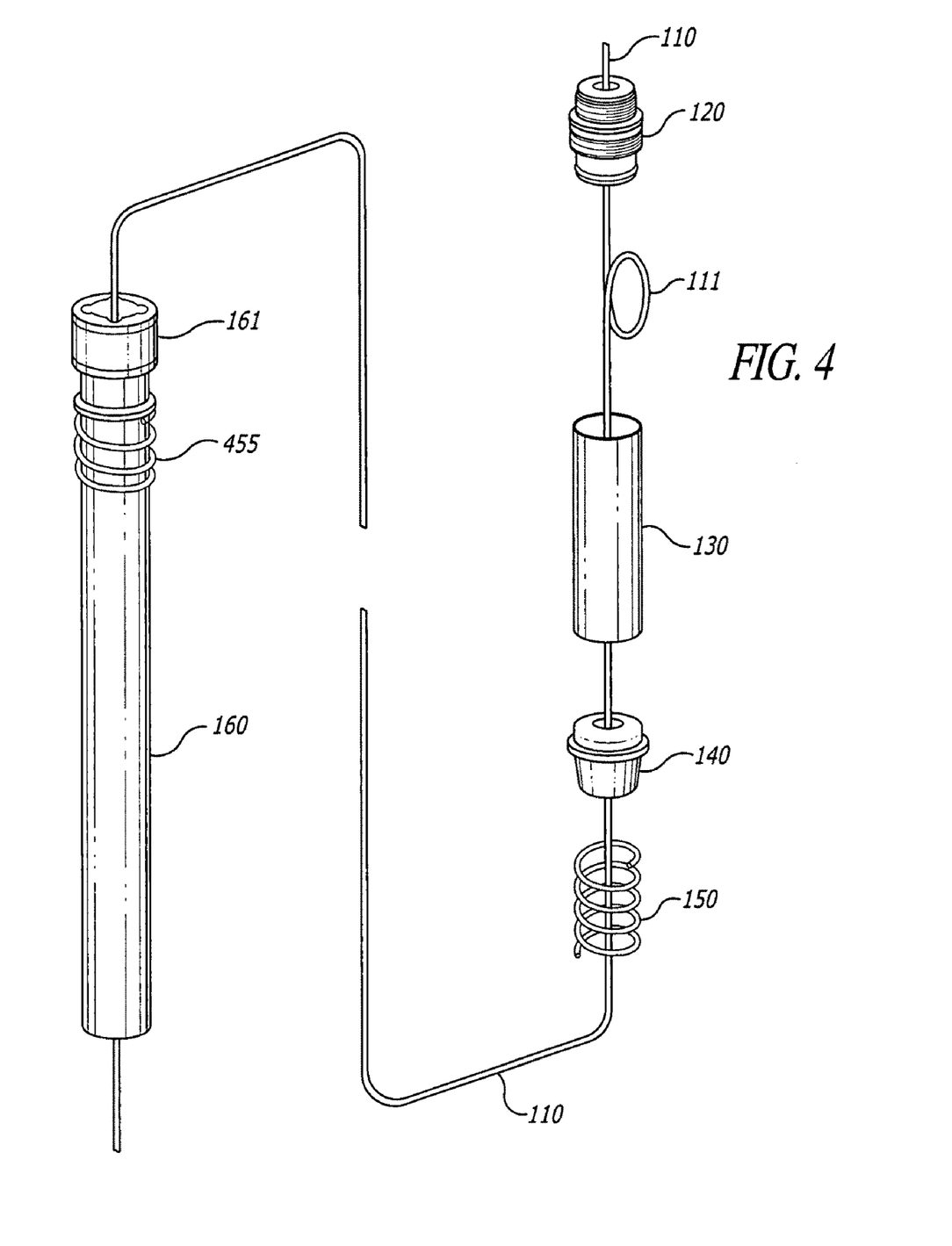
FIG. 4 is an exploded view of the assembly of the piston in relation to the top out and bottom out spring.

The inner tube assembly 160 has an aperture in the piston 161 for passage of the brake line 110 through the piston 161 and the inside tube assembly 160. The suspension system of the brake caliper leg has the main spring 185 and a top out spring 455 as well as a bottom out spring 150. The top out spring 455 is mounted to the outside surface of the inner tube assembly 160. A clip, or other annular member can retain the upper portion of the top out spring 455 against the outside wall of the inner tube assembly 160. With the top out spring 455 attached, it presses against an annular shelf formed in the outer tube 170. The annular shelf could be mounted higher such as in the middle of the outer tube 170, or lower toward the bottom of the outer tube 170 such as at oil seal annular ring 167.

The term, top out, refers to a circumstance in which the motorcycle suspension system is pulled away from the motorcycle. When operational conditions have exceeded the mainspring capabilities, the more rigid top out spring is rendered necessitous. Similarly, the bottom out spring 150 protects against a situation wherein operational conditions exceed mainspring capabilities. Hitting speed bumps or road debris at high speeds are examples of such circumstances wherein the suspension system is pushed against the motorcycle, forcing a bottom out. In order to effectively compensate for such conditions, the top out and bottom out spring should be far more rigid than the mainspring.

Figure 3:
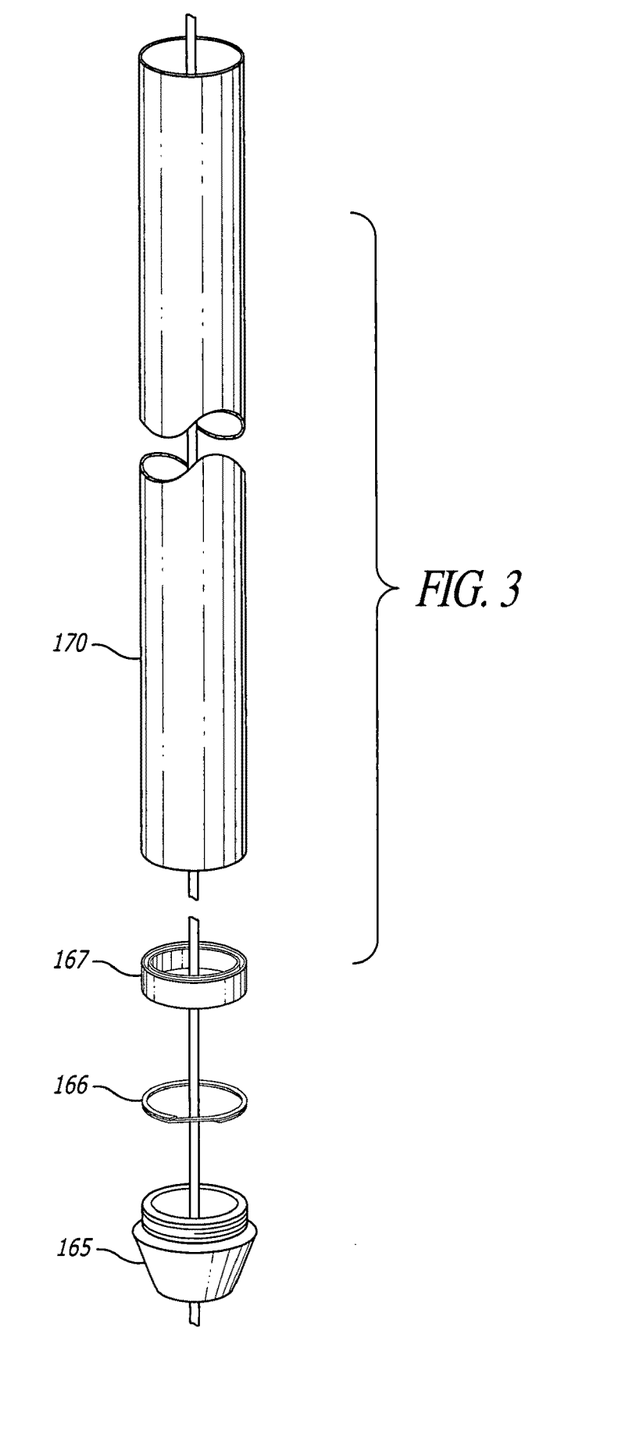
FIG. 3 is an exploded view of the outer tube.

The main housing 170 is formed as cylinder and is also called the outer tube 170 because it substantially encloses all other components, including the bottom out spacer 130, spring top 140, bottom out spring 150, top out spring 455, upper portion of the inner tube 160, and push rod tube 180. The outer tube hides most of the other components from external visibility. The inner tube 160 inside and below the outer tube is the only other externally visible apparatus and appears to slide out of the outside tube 170. The main housing 170 has an upper portion that has connection with a portion of upper retainer 120. Thus, upper retainer 120 has a lower portion that retains to main housing 170 as well as bottom out spacer 130.

The seal cover 165 receives an annular seal retainer that is the snap ring 166 and an oil seal formed as a ring 167. The upper portion of the seal cover 165 screws into the lower portion of the outer tube 170 which is threaded for allowing screw connection. The seal cover 165 has an aperture disposed within it to provide translational movement relative to the inner tube 160 that passes through the seal cover 165 aperture. The seal cover 165 has an aperture that is sized to be slightly larger than the inside tube 160. The seal cover 165 fits over the adjustable height assembly, here formed as a push rod 180. The push rod 180 fits coaxially within the inside tube 160.

The adjustable push rod 180 adjusts the neutral position length of the mainspring. The adjustable pushrod 180 also fits within inside tube 160. The adjustable height assembly 180 is hollow, allowing for the brake line 110 to pass through. The adjustable height assembly 180 also has a retaining clip shown here as a snap ring 182 retained upon the highest of one of a plurality of pushrod tube grooves 183. A rigid flexible sleeve 184 preferably encapsulates the brake line 110 below the line loop 111. A main spring 185 that is the lowest spring rests against the retaining clip 182, spring washer 188 and supports the system. The mainspring 185 moves during normal operation of the motorcycle supporting the full weight of the motorcycle fork leg and front portion of the motorcycle. The mainspring 185 pushes against the bottom of the fork leg which is the disc brake assembly 190. The disc brake assembly 190 has an upper portion that has an external threaded connection to the bottom inside surface of inside tube 160. The disc brake assembly 190 further includes a flat annular region disposed on a top surface of the disc brake assembly 190 that is within the circumference of the external threaded connection. The flat annular region supports the mainspring 185. The flat annular region optionally includes a central portion that protrudes above the flat annular region so that the connection between the brake line 110 and the disc brake assembly 190 is above the interface of the mainspring 185 and the flat annular region support area. Thus, the inside tube 160 is bounded at a lower end being the disc brake assembly 190 and at an upper end being the piston 161 and telescopic sliding connection with the outside tube 170.

The mainspring 185 supports the retaining clip 182, which supports the adjustable height assembly 180. The adjustable height assembly 180 supports the spring top 140. The adjustable height assembly 180 has a diameter that is sized to fit within a recess formed in the bottom of the spring top 140. The adjustable height assembly 180 thus pushes up the spring top 140 which in turn pushes up the bottom out spacer 130, which in turn supports the upper retainer 120. The upper retainer 120 supports the motorcycle fork leg and the motorcycle fork tree, or leg clamp that attaches the motorcycle suspension to the motorcycle frame.

Figure 5:
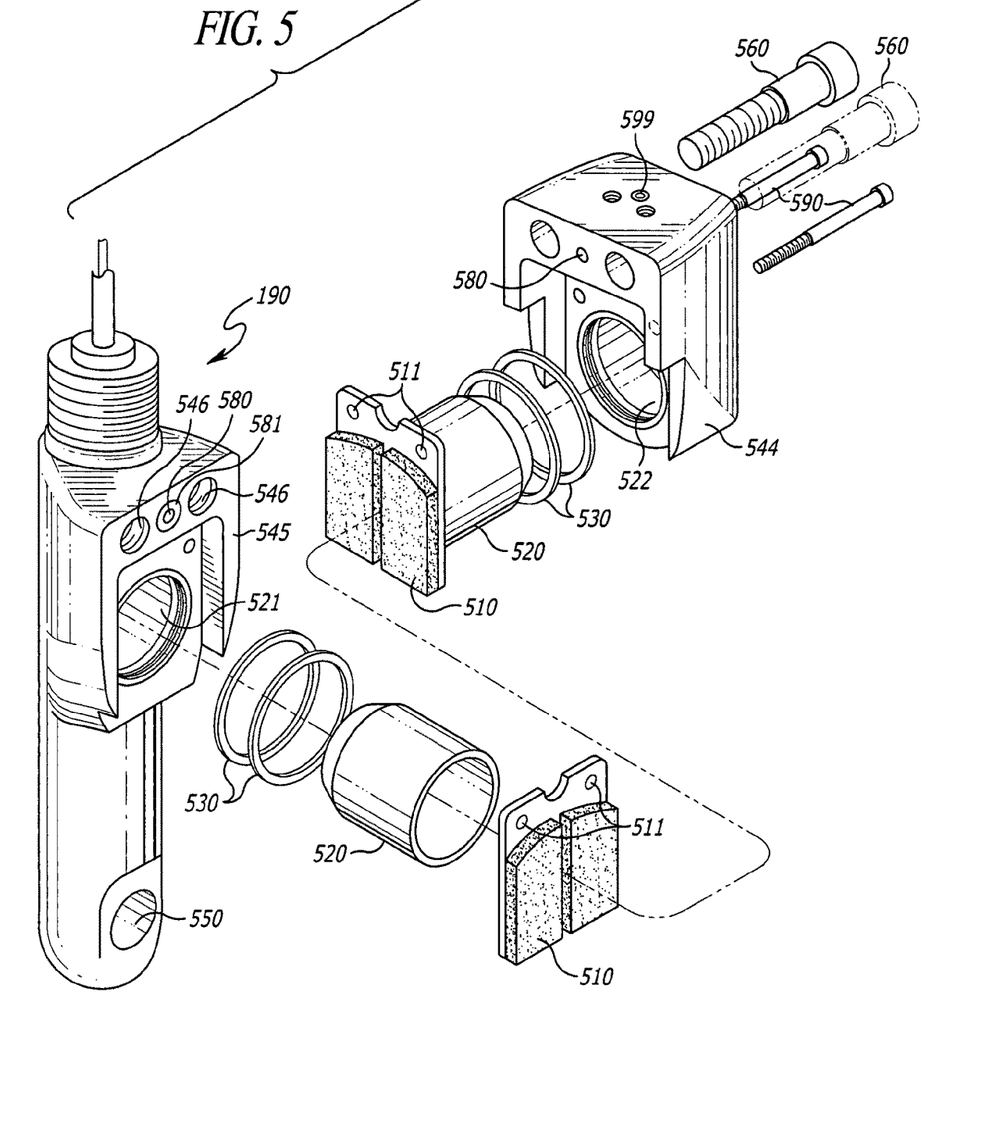
FIG. 5 is an exploded view of the lower leg showing the disk brake.

The brake line is typically filled with oil after assembly and has dynamically varying hydraulic pressure. The brake line terminates at the disk brake assembly 190. FIG. 5, the disk brake has a pair of brake pads 510 biased together by a pair of brake pistons 520. Brake pistons 520 are sealed with o-ring seals 530. Such seals maintain hydraulic pressure, transmitting the brake line pressure against the pistons 520 that transmit pressure against the brake pads 510 which in turn transmit pressure against the disk portion of a wheel. The wheel is mounted on the wheel axis shown as aperture 550.

The disk brake assembly 190 is formed by a pair of piston assemblies. The disk brake assembly 190 also includes a pair of bolts 560 that are partially threaded and serve to secure the outside brake assembly 544 against the inside brake assembly 545. The bolts 560 secure into threads 546. The brake line hydraulic pressure is transmitted from the inside brake assembly 545 to the outside brake assembly 544 via a conduit 580. A seal 581 seals the conduit as seen in FIG. 5 at an interface. The inside piston aperture 521 opposes the outside piston aperture 522. Preferably, a pair of bolts 590 secure through the outside brake assembly 544 and pass through the brake pads 510 at brake pad guide points 511 and secure into threads within the inside brake assembly. Preferably, a bleeder cap 599 will allow drainage of the hydraulic fluid such as oil or water.

Figure 2:
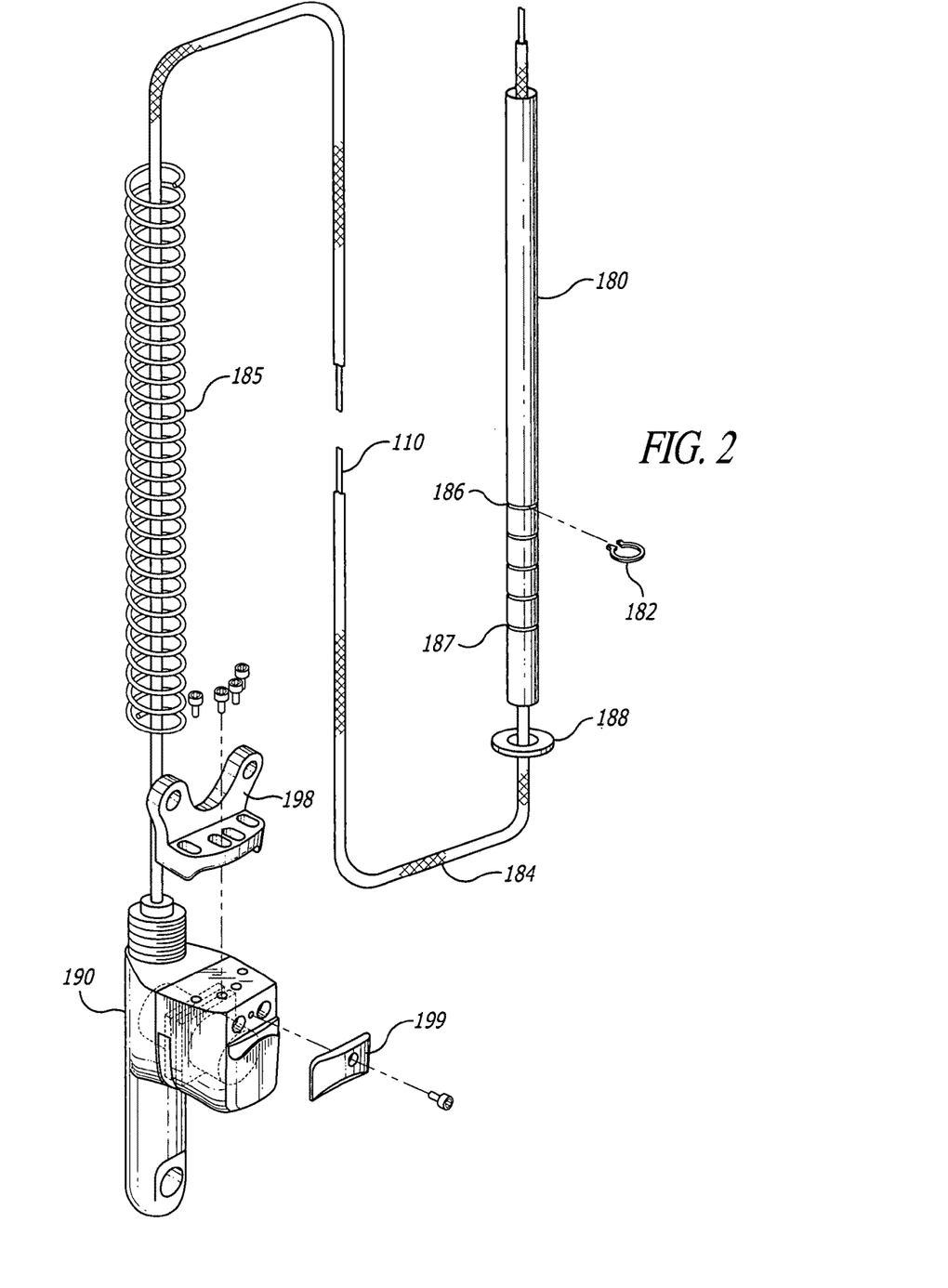
FIG. 2 is an exploded view of the push rod assembly.

FIG. 2 shows the adjustable height assembly 180 receiving the retaining clip 182 in the top position 186. The top position 186 is above the other five positions and the lower position 187. The retaining clip 182 supports a retaining washer 188 that rests against the retaining clip 182. The rigid sleeve 184 although shown as bent in the drawing is actually substantially straight, and supports the line 110. The main spring 185 rests against the retaining washer 188.

A fender mount 198 is attached to the disk brake assembly 190 integral to the lower leg, allowing a fender to be mounted to the motorcycle. The fender mount 198 is preferably secured to the disk brake assembly by four machine screws as in FIG. 2. A faceplate also called a tombstone 199 allows a cleaner look and keeps dust out by covering the various apertures and bolt head formed by the bolts 590, 560.

Figure 6:
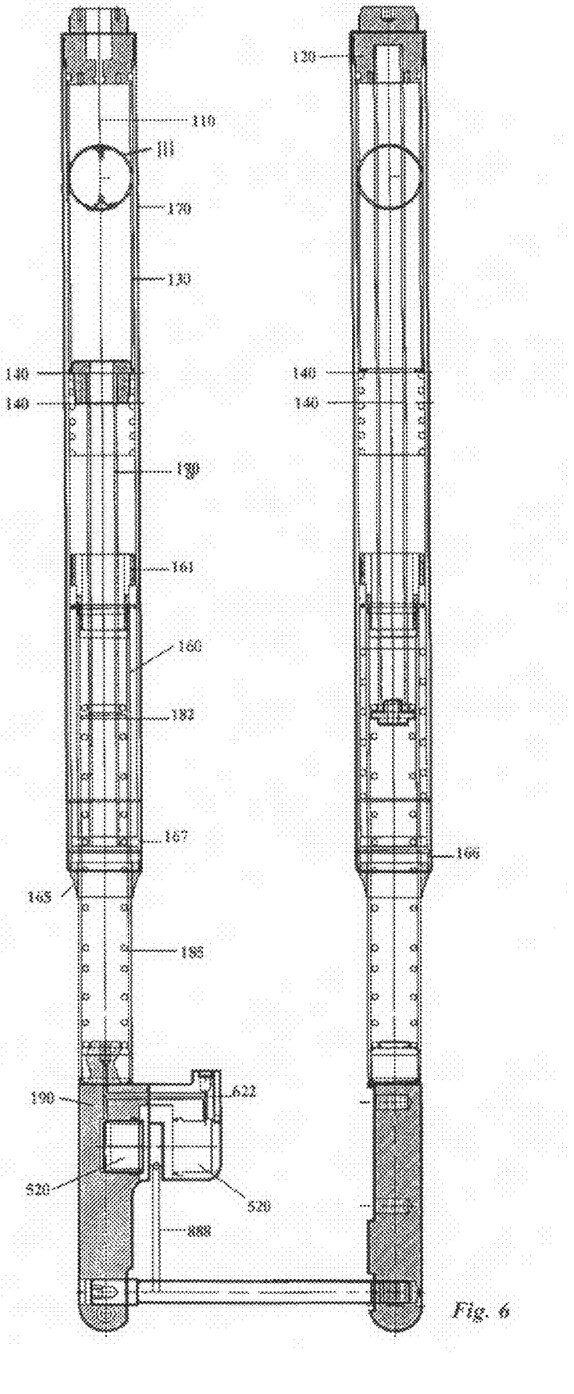
FIG. 6 is a cross section view of the assembled invention.

FIG. 6 shows that the spring top 140 receives the push rod 180 that rests the mainspring. Also, FIG. 6 shows the correct assembly of the components shown in FIG. 1. The spring top 140 receives both the bottom out spring 150 and the push rod tube 180. The load is transmitted through the push rod tube 180. The bottom out spring 150 interacts with the piston 161 upon extreme operating conditions. The piston 161 is held snugly within the outer tube 170. Oil passes through ports located in the walls of the inner tube 160. Inner tube 160 has ports that are preferably below the piston 161 attached to the inner tube 160.

The inside piston assembly is integrally formed to the caliper leg of the fork. Here, the inside piston assembly is made of the same piece of metal that supports the fork. An axle is held between the pair of fork legs.

After assembly, the device is partially filled with oil, leaving an air gap at the top. The device should be filled with oil above the position of the piston, allowing for lubrication of the piston.

The oil also adds dampening. After the device is filled with oil, it can be mounted on the motorcycle so that it receives a brake rotor 888 between the brake pads. The brake rotor is flat and corotationally mounted on a wheel axis. The motorcycle fork legs have a lower end allowing mounting of a front wheel axle between the motorcycle legs. The front wheel axle has a brake rotor 888 that cooperates with the brake pistons. The lower fork leg receives the inside brake piston as well as receiving a wheel axle.

Call Out List of Elements
Brake Line 110
Upper Retainer 120
Upper Cylinder 130
Line Loop 111
Spring Top 140
Bottom Out Spring 150
Piston 161
Bottom Out Spring 151
Main Housing Aka Outer Tube 170
Inside Tube Assembly 160
Main Spring 185
Top Out Spring 455
Oil Seal Annular Ring 167
Push Rod Tube Aka Adjustable Height Assembly 180
Seal Cover 165
Snap Ring 166
Snap Ring Aka Retaining Clip 182
Pushrod Tube Grooves 183
Rigid Flexible Sleeve 184
Spring Washer Aka Retaining Washer 188
Disc Brake Assembly 190
Pair Of Brake Pads 510
Brake Pistons 520
O-Ring Seals 530
Wheel Axis Aperture 550
Bolts 560
Outside Brake Assembly 544
Inside Brake Assembly 545
Bolt Threads 546
Brake Line Conduit 580
Conduit Seal 581
Inside Piston Aperture 521
Outside Piston Aperture 522
Outside Brake Assembly Pair Of Bolts 590
Brake Pad Guide Points 511
Bleeder Cap 599
Retaining Clip Top Position 186

Lower Position 187
Fender Mount 198
Faceplate Aka Tombstone 199
Brake Rotor 888

The invention claimed is:

1. A motorcycle brake and suspension system comprising:
   an outer tube, having an upper end and a lower end;
   an inside tube in sliding configuration with the outer tube and telescopically extending in protrusion from the outer tube;
   a lower fork leg forming an axle retention;
   an inside piston housed within the lower fork leg;
   a mainspring mounted at least partially inside the inside tube, wherein the lower fork leg supports the mainspring;
   a pushrod mounted at least partially within the inside tube, wherein the mainspring supports the pushrod;
   an upper retainer wherein the pushrod supports the upper retainer, wherein the upper retainer is located within the outer tube;
   a bottom out spacer that is hollow and located above the upper retainer, wherein the bottom out spacer is supported by the upper retainer;
   a brake line that passes through the outer tube and inside tube, wherein the brake line is looped to allow slack at a brake line loop, and
   an outside piston mounted opposite to the inside piston, wherein the brake line actuates the outside piston against the inside piston and wherein the brake line actuates the inside piston against the outside piston so that the inside piston and outside piston cooperate for clamping against a brake rotor.

2. The motorcycle brake and suspension system of claim 1, wherein the brake line is looped within the bottom out spacer.

3. The motorcycle brake and suspension system of claim 1, further comprising an integrated caliper disk brake actuated by the brake line, wherein the integrated caliper disk brake further includes a pair of pistons, namely the inside piston that is housed within the lower fork leg and an outside piston that is mounted opposite to the inside piston.

4. The motorcycle brake and suspension system of claim 3, further comprising a fender bracket mounted on the brake caliper.

5. The motorcycle brake and suspension system of claim 3, wherein the integrally formed brake fluid passages are hydraulically operative inside the load bearing portion of the fork leg.

6. The motorcycle brake and suspension system of claim 3, wherein the pushrod is adjustable and supports the mainspring via a retaining clip that mounts on one of a plurality of grooves formed on an outside surface of the pushrod, whereby the pushrod adjusts for adjusting the neutral position length of the mainspring.

7. A motorcycle brake and suspension system comprising:
   an outer tube, having an upper end and a lower end;
   an inside tube in sliding configuration with the outer tube and telescopically extending in protrusion from the lower end of the outer tube;
   a mainspring mounted at least partially inside the inside tube;
   a pushrod mounted at least partially within an inside tube, wherein the mainspring supports the pushrod;
   an upper retainer wherein the pushrod supports the upper retainer, wherein the upper retainer is located within the outer tube;
   a bottom out spacer that is hollow and located above the upper retainer, wherein the bottom out spacer is supported by the upper retainer;
   a brake line that passes through the outer tube, wherein the brake line is looped to allow slack at a brake line loop, wherein the brake line loop is within the outer tube, and
   an outside piston mounted opposite to the inside piston, wherein the brake line actuates the outside piston against the inside piston and wherein the brake line actuates the inside piston against the outside piston so that the inside piston and outside piston cooperate for clamping against a brake rotor, wherein the brake rotor is flat and corotationally mounted on a wheel axis.

8. The motorcycle brake and suspension system of claim 7, further comprising an integrated caliper disk brake actuated by the brake line, wherein the integrated caliper disk brake further includes a pair of pistons, namely the inside piston that is housed within the lower fork leg and an outside piston that is mounted opposite to the inside piston.

9. The motorcycle brake and suspension system of claim 8, further comprising a fender bracket mounted on the brake caliper.

10. The motorcycle brake and suspension system of claim 9, wherein the integrally formed brake fluid passages are hydraulically operative inside the load bearing portion of the fork leg.

11. The motorcycle brake and suspension system of claim 9, wherein the pushrod is adjustable and supports the mainspring via a retaining clip that mounts on one of a plurality of grooves formed on an outside surface of the pushrod, whereby the pushrod adjusts for adjusting the neutral position length of the mainspring.

12. A motorcycle brake and suspension system comprising:
   an outer tube, having an upper end and a lower end;
   an inside tube in sliding configuration with the outer tube and telescopically extending in protrusion from the lower end of the outer tube;
   a mainspring mounted at least partially inside the inside tube;
   a pushrod mounted at least partially within an inside tube, wherein the mainspring supports the pushrod;
   an upper retainer wherein the pushrod supports the upper retainer;
   a bottom out spacer that is hollow and located above the upper retainer, wherein the bottom out spacer is within the outer tube;
   a brake line that passes through the outer tube, wherein the brake line is looped to allow slack at a brake line loop, wherein the brake line loop is within the bottom out spacer, and
   an outside piston mounted opposite to the inside piston, wherein the brake line actuates the outside piston against the inside piston and wherein the brake line actuates the inside piston against the outside piston so that the inside piston and outside piston cooperate for clamping against a brake rotor, wherein the brake rotor is flat and corotationally mounted on a wheel axis.

13. The motorcycle brake and suspension system of claim 12, further comprising an integrated caliper disk brake actuated by the brake line, wherein the integrated caliper disk brake further includes a pair of pistons, namely the inside piston that is housed within the lower fork leg and an outside piston that is mounted opposite to the inside piston.

14. The motorcycle brake and suspension system of claim 13, further comprising a fender bracket mounted on the brake caliper.

15. The motorcycle brake and suspension system of claim 13, wherein the integrally formed brake fluid passages are hydraulically operative inside the load bearing portion of the fork leg.

16. The motorcycle brake and suspension system of claim 12, wherein the pushrod is adjustable and supports the mainspring via a retaining clip that mounts on one of a plurality of grooves formed on an outside surface of the pushrod, whereby the pushrod adjusts for adjusting the neutral position length of the mainspring.

* * * * *